Oct. 11, 1966  M. ABTS  3,277,876
CRANKCASE VENTILATION SYSTEM FOR AN INTERNAL COMBUSTION SYSTEM
Filed Sept. 30, 1964  2 Sheets-Sheet 1

MANFRED ABTS
INVENTOR
BY John L. Faulkner
Ernest H. Beutler
ATTORNEYS

Oct. 11, 1966 M. ABTS 3,277,876
CRANKCASE VENTILATION SYSTEM FOR AN INTERNAL COMBUSTION SYSTEM
Filed Sept. 30, 1964 2 Sheets-Sheet 2

MANFRED ABTS
INVENTOR

BY John L. Faulkner
Ernest A. Beutler
ATTORNEYS

United States Patent Office 3,277,876
Patented Oct. 11, 1966

3,277,876
CRANKCASE VENTILATION SYSTEM FOR AN INTERNAL COMBUSTION SYSTEM
Manfred Abts, Leverkusen, Germany, assignor to Ford Motor Company, Dearborn, Mich., a corporation of Delaware
Filed Sept. 30, 1964, Ser. No. 400,425
8 Claims. (Cl. 123—119)

This invention relates to crankcase ventilating systems for an internal combustion engine and more particularly to a ventilating system that reduces the emission of unburned hydrocarbons and other pollutants from an engine crankcase to the atmosphere.

The ventilating gases that are exhausted from the crankcase of an internal combustion engine contain a considerable volume of unburned hydrocarbons and other air pollutants. These gases enter the crankcase primarily as a result of piston blow-by. In a known design used in the automotive industry these gases are discharged into the engine induction system for further oxidation during combustion in the cylinders to reduce air pollution. Several problems are encountered, however, when the crankcase gases are induced into the induction system.

When the ventilating gases are induced into the induction system on the downstream side of the carburetor, carburetor calibration is adversely affected. The carburetor should discharge a richer fuel air ratio to compensate for the additional air flow which it does not sense. It cannot do this, however, unless its calibration is modified. But modifying the carburetor calibration is not entirely satisfactory since the rate of ventilating air flow may not be directly proportional to engine speed or induction system vacuum. It is desirable, therefore, to induce the crankcase ventilating gases into the induction system on the upstream side of the carburetor. This is difficult to do in many instances because of the restrictions on available space in the engine compartment.

It is the principal object of this invention to provide an air filter assembly for an internal combustion engine that makes provision for the induction of crankcase ventilating gases into an air filter assembly located on the upstream side of the carburetor.

An internal combustion engine embodying this invention includes an air induction system having an air filter assembly. The engine also has a crankcase ventilating system that includes a ventilating air inlet and a ventilating air outlet. The air filter assembly has an air inlet and an air outlet with an air filter medium positioned therebetween. A first conduit means is provided to connect the ventilating air inlet with the air filter assembly. A second conduit means is provided to connect the ventilating air outlet with the air filter assembly so that crankcase ventilating gases may be discharged into the induction system. Means are additionally provided to create a pressure differential between the first and second conduits so that a positive flow of ventilating gases will be assured through the crankcase ventilating system.

As a further feature of this invention, the connection between the first conduit means and the air filter assembly may be made downstream from the air filter medium. In this way, the air filter medium will also act as a filter for the crankcase ventilating air.

As a still further feature of this invention, the air filter assembly may be formed with a venturi section in its air outlet. The crankcase ventilating gases are discharged into the air filter assembly at the throat of the venturi section.

Further objects and advantages of this invention will become more apparent when considered in conjunction with the appended drawings, wherein.

Figure 1:
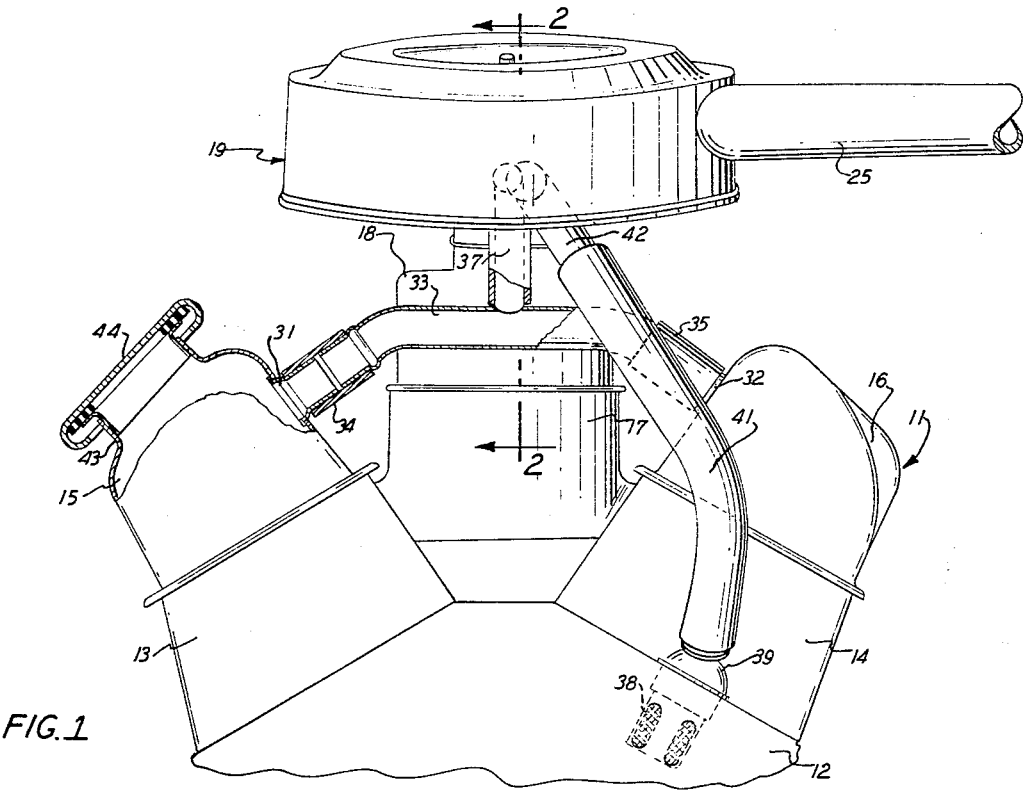
FIGURE 1 is a front plan view, with parts shown in section, of a portion of an internal combustion engine embodying this invention.
Figure 2:
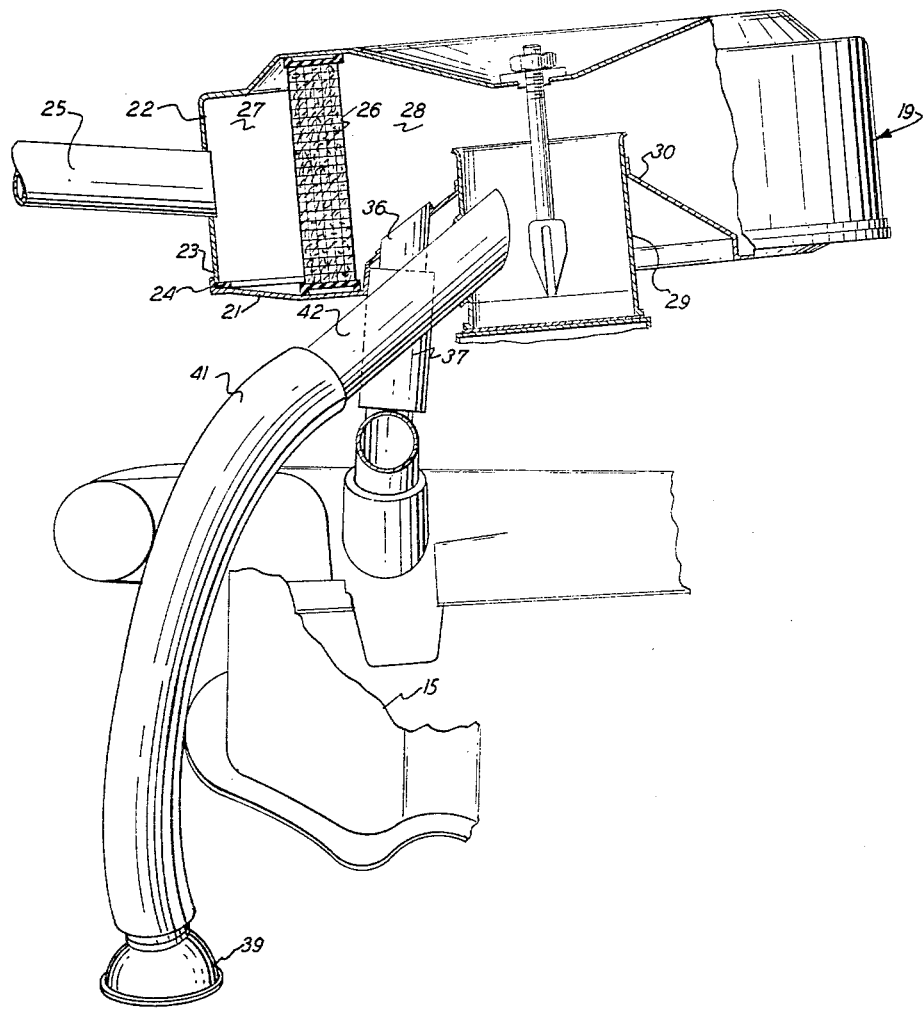
FIGURE 2 is a partial perspective view, with portions shown in section, taken generally in the direction of the line 2—2 of FIGURE 1.

Referring now in detail to the drawings and in particular to FIGURES 1 and 2, an internal combustion engine embodying this invention is indicated generally by the reference numeral 11. The engine 11 is of a V-type having a cylinder block 12 with angularly disposed cylinder banks. Cylinder heads 13 and 14 are received upon each of the cylinder banks of the cylinder block 12. Valve covers 15 and 16 enclose an overhead valve operating mechanism (not shown) of the cylinder heads 13 and 14, respectively. The engine 11 also includes an induction system comprising an intake manifold 17, a carburetor 18 and an air filter assembly, indicated generally by the reference numeral 19.

Referring now to FIGURE 2, the air filter assembly 19 includes a sheet metal body assembly made up of a tray 21 and a cover plate 22. The cover plate 22 has an inverted cup shape and is formed with a lower flange 23 which engages a gasket 24 positioned around the outer periphery of the tray 21. An air inlet snorkel 25 extends through the depending portion of the cover plate 22. A filter medium in the form of an air filter cartridge 26 of any known type is positioned between the tray 21 and the cover plate 22. The air filter cartridge 26 divides the body assembly into an outer annular air inlet portion 27 and an inner cylindrical air outlet portion 28. An air outlet conduit 29 is supported by a frusto conical section 30 formed in the center of the tray 21. The air outlet conduit 29 is positioned in registry with the air inlet of the carburetor 18 to deliver a supply of filtered air to the carburetor 18.

The engine 11 also includes a crankcase ventilating system for circulating air through the crankcase and other internal complements of the engine. The interior details of the engine that accomplish the desired air flow within the engine are not part of the invention and will not be described in detail. The crankcase ventilating system must include, however, at least one ventilating air inlet and at least one ventilating air outlet.

In the disclosed engine, ventilating air inlets 31 and 32 are positioned in the valve covers 15 and 16, respectively. The ventilating air inlets 31 and 32 are connected to a sheet metal T assembly, indicated generally by the reference numeral 33, by flexible conduits 34 and 35. The T assembly is also in communication with the air filter assembly 19 on the down stream side of the filter cartridge 26 through a tubular member 36 that is secured to the frusto conical section 30 of the tray 21. A flexible conduit 37 interconnects the tubular member 26 with the T assembly 33. It should be readily apparent that air which has been filtered by the cartridge 26 will be drawn into the crankcase ventilation system of the engine through the T assembly 33 and ventilating air inlets 31 and 32.

After circulation through the engine 11, the ventilating air is passed through an oil separator 38 that may be of any known type although a steel mesh separator is illustrated. The separator 38 is supported at the mouth of a ventilating air outlet 39 that is positioned within the cylinder block 12. A flexible conduit 41 carries the crankcase ventilating gases from the ventilating air outlet 39 to a pipe 42 that projects into the air outlet conduit 29 of the air filter assembly 19.

Since the air flowing past the mouth of the pipe 42 through the outlet conduit 29 has a higher velocity than the air flowing past the mouth of the pipe 36 through the air outlet portion 28, the pressure in the pipe 42 will be less than the pressure in the pipe 36. This pressure differential will result in a positive flow of ventilating air through the crankcase at all times. If for any reason there should be a reverse flow of ventilating gases, the gases discharged from the tubular member 36 will be drawn into the induction system and cannot escape to the atmosphere. The ventilating system disclosed, therefore, is a "closed system."

A suitable mechanism may be provided to permit the addition of oil to the engine lubricating system. This mechanism may comprise a filler pipe 43 positioned within the valve cover 15. The pipe 43 is closed by a filler cap 44. When the filler cap 44 is received upon the pipe 43 it effectively seals the pipe 43 so that air cannot flow into or out of the valve cover 15 through the pipe 43.

Figure 3:
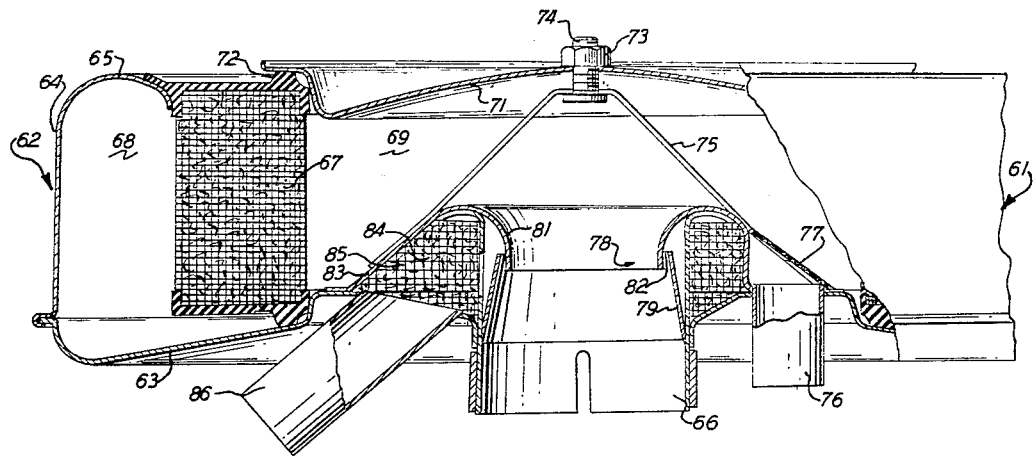
FIGURE 3 is a cross-sectional view of an air filter assembly showing another embodiment of this invention.

Referring now to the embodiment shown in FIGURE 3, an air filter assembly is indicated generally by the reference numeral 61. It is to be understood that the air filter assembly 61 may be used in conjunction with an engine having a crankcase ventilating system of the type shown in FIGURES 1 and 2 or any other type of crankcase ventilating system as long as at least one ventilating air inlet and one ventilating air outlet are provided.

The air filter assembly 61 comprises a sheet metal body assembly 62 having a lower tray 63, an upstanding cylindrical wall 64 and an inwardly extending upper flange 65. The tray 63 has a downwardly extending central cylindrical part 66 that forms an air outlet for the filter assembly 61 and may be attached to the air inlet of a carburetor or other type of charge forming device. A filter medium in the form of an air filter cartridge 67 of any known type may be supported upon the tray 63 to divide the body assembly 62 into an annular air inlet portion 68 and a cylindrical air outlet portion 69. A cover 71 engages a resilient sealing cap 72 of the air filter cartridge 67 to prevent leakage of air into the air outlet portion 69 past the air filter cartridge 67. The cover 71 is held in place by a nut 73 that is threaded onto a bolt 74. The bolt 74, in turn, is secured to an upwardly extending bracket 75 which is spot welded to the tray 63.

As in the embodiment of FIGURES 1 and 2, the air filter assembly 61 provides a source of filtered air that is circulated through the crankcase ventilating system of an internal combustion engine. The air filter assembly 61 also provides a crankcase ventilation air outlet for discharging the ventilation gases into the engine induction system. The inlet connection for supplying filtered air to the ventilating system is provided by a tubular member 76 which extends through and is spot welded to the tray 63. A steel screen 77 is supported across the mouth of the tubular member 76 to provide backfire protection so that burning gases cannot enter the crankcase ventilating system from the engine induction system.

A venturi section, indicated generally by the reference numeral 78, is positioned in communication at its downstream side with the air outlet 66. The venturi section 78 comprises first, a frusto conical sheet metal section 79 that is spot welded to the air outlet 66 and forms the diverging portion of the venturi section. A second, toroidal sheet metal section 81 terminates adjacent the inlet side of the frusto conical section 79 to form the converging portion of the venturi section. An annular air gap 82 is formed between the venturi sections 79 and 81 to provide a ventilating air outlet, as will become more apparent as this description proceeds.

The second venturi section 81 has an integral portion 83 that extends downwardly toward the tray 63. The portion 83 is spot welded around its periphery to the tray 63 to define an enclosed annular chamber 84. The annular chamber 84 is filled with a wire mesh filter medium 85 which functions as an oil separator for the crankcase ventilation gases. One side of the filter medium 85 is open to the annular clearance or gap 82. A ventilating air outlet conduit 86 extends through the tray 63 to which it is affixed and terminates within the chamber 84 at the other side of the filter medium 85.

In operation, clean air for crankcase ventilation is drawn from the tubular member 76 to the crankcase ventilating system of an internal combustion engine in any suitable manner. After the air has been circulated through the crankcase system it is discharged into the ventilating air outlet conduit 86. The gases then pass through the filter medium 85 where oil and solid particles as well as water vapor may be removed. The ventilating gases then flow into the venturi section 78 because of the low static pressure that exists in the annular air gap 82 positioned at the throat of the venturi section 78. The gases will then be directed into the engine induction system. As in the preceding embodiment, any backflow through the ventilating system as a result of abnormal blow-by, will also be discharged into the air filter assembly 61 on the downstream side of the filter cartridge 67. The gases, therefore, will be drawn into the induction system.

It is to be understood that the described embodiments are preferred forms which the invention may take and that various changes and modifications may be made without departing from the spirit and scope of the invention as defined by the appended claims.

What I claim is:

1. An internal combustion engine comprising an induction system, an air filter assembly for said induction system, said air filter assembly including a filter medium for filtering induction system air, a crankcase ventilation system for said engine including a ventilating air inlet and a ventilating air outlet, first air conduit means for directing air flow from said air filter assembly to said ventilating air inlet, second air conduit means for directing air flow from said ventilating air outlet to said air filter assembly, and means in said air filter assembly for creating a pressure differential between said ventilating air inlet and said ventilating air outlet to cause a positive flow of ventilating air gases through said crankcase ventilating system into said induction system, filter assembly comprising an air intake region of large volume and a flow outlet region of reduced cross sectional area, the intake air received by said intake region being accelerated as it passes through said flow outlet region into the engine induction system, said first air conduit communicating at its inlet end with said air intake region and said second air conduit communicating at its outlet end with said flow outlet region whereby a pressure differential is established in said ventilation system that maintains a forced ventilating air flow.

2. An internal combustion engine comprising an induction system having an air filter assembly, a crankcase ventilation system including a ventilating air inlet and a ventilating air outlet, said air filter assembly including an air filter medium, first conduit means interconnecting said ventilating air inlet with said air filter assembly on the downstream side of said air filter medium for discharging ventilating air from said air filter assembly into said ventilating air inlet, second conduit means interconnecting said ventilating air outlet with said air filter assembly at the downstream side of said air filter medium, and means for creating a pressure differential between the points of connection of said first and second conduit means to said air filter assembly for the causing a positive flow of ventilating air through said crankcase ventilating system, said last-named means comprising an air inlet chamber of relatively large volume surrounded by said filter medium and a flow directing conduit of relatively reduced cross sectional area extending from said inlet chamber and said second conduit means communicating with said flow directing conduit.

3. An internal combustion engine as defined by claim 2 wherein an oil separator is interposed in the second conduit means.

4. An internal combustion engine comprising an induction system including an air filter assembly, a crankcase ventilation system including a ventilating air inlet and a ventilating air outlet, said air filter assembly including an air inlet, an air inlet chamber of large volume communicating with said air inlet, an air outlet having a flow area of reduced cross sectional area in communication with said induction system and an air filter medium interposed between said air inlet and said air outlet, first conduit means for interconnecting said air inlet chamber with said ventilating air inlet, and second conduit means for interconnecting said ventilating air outlet with the air outlet of said air filter assembly to create a positive flow of air through said crankcase ventilation system from said ventilating air inlet into said induction system.

5. An internal combustion engine comprising an induction system including an air filter assembly, said air filter assembly including an air inlet, an air outlet in communication with said induction system and an air filter media interposed between said air inlet and said air outlet, a crankcase ventilation system including a ventilating air inlet and a ventilating air outlet, first conduit means interconnecting said air filter assembly with said ventilating air inlet, second conduit means interconnecting said ventilating outlet with the air outlet of said air filter assembly, and flame shield means positioned at the point of connection of said second conduit means with said air filter assembly.

6. An internal combustion engine comprising an air induction system including an air filter assembly, a crankcase ventilating system including a ventilating air inlet and a ventilating air outlet, said air filter assembly including an air inlet, an air outlet in communication with said air induction system, an air filter media interposed between said tir inlet and said air outlet and a venturi section interposed between said air filter media and said air outlet, first conduit means interconnecting said ventilating air inlet with said filter assembly, and second conduit means interconnecting said ventilating air outlet with the throat of said venturi section to create a positive flow of air through said crankcase ventilation system from said ventilating air inlet into said induction system at said throat.

7. An air filter assembly for an internal combustion engine comprising a body member defining an air inlet and an air outlet, an air filter media supported by said body member and interposed between said air inlet and said air outlet, said body member further defining a venturi section in communication at one end with said air outlet and in communication at its other end with said air filter assembly posterior to said air filter media, an opening formed at the throat of said venturi section, a supplemental filtration assembly supported around said throat and being in communication at one side with said opening, and means providing a supplemental air inlet to said filtration assembly.

8. An internal combustion engine comprising an induction system including an air filter assembly, said air filter assembly including a body member defining an air inlet and an air outlet, an air filter media supported by said body member and interposed between said air inlet and said air outlet, said body member further defining a venturi section in communication at one end with said air outlet and in communication at its other end with said air filter assembly posterior to said air filter media, an opening formed at the throat of said venturi section, a supplemental filtration assembly supported around said throat, said supplemental filtration assembly including a supplemental air inlet, a supplemental filter media, and a supplemental air outlet in communication with said opening, a crankcase ventilation system for said engine including a ventilating air inlet and a ventilating air outlet, first conduit means interconnecting said ventilating air inlet with said body member posterior to said air filter media, and second conduit means interconnecting said ventilating air outlet with said supplemental air inlet.

References Cited by the Examiner
UNITED STATES PATENTS

| | | | |
|---|---|---|---|
| 2,797,674 | 7/1957 | Dolza | 123—119 |
| 2,906,252 | 9/1959 | Beardsley | 123—119 |
| 3,030,942 | 4/1962 | Thompson | 123—119 |
| 3,167,060 | 1/1965 | Fowler | 123—119 |

OTHER REFERENCES 661,649    11/1951    Great Britain.

CARLTON R. CROYLE, *Primary Examiner.*

KARL J. ALBRECHT, *Examiner.*